United States Patent Office 3,096,243
Patented July 2, 1963

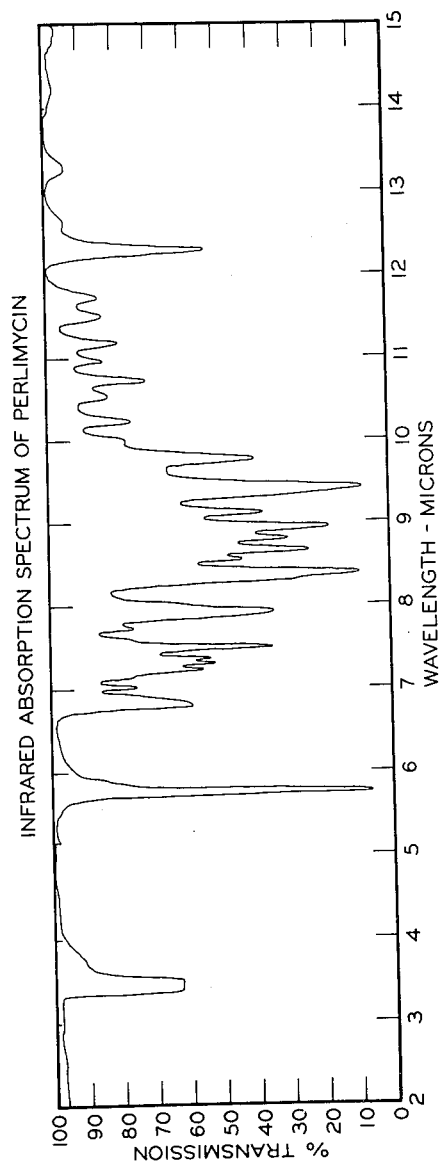

3,096,243
PERLIMYCIN
Felix Edward Pansy, Jamesburg, and James Dean Dutcher, New Brunswick, N.J., assignors to Olin Mathieson Chemical Corporation, New York, N.Y., a corporation of Virginia
Filed Nov. 21, 1961, Ser. No. 153,946
3 Claims. (Cl. 167—65)

This invention relates to a new antibiotic and to a method for its production. The new antibiotic is produced by an actinomycete of the genus Streptomyces isolated from a soil sample from Paris, France.

The following is a description of the microorganism.

The microorganism's sporophores are produced in tufts, erect and not forming spirals. On this basis it falls in Pridham's morphology section. *Rectus flexibilis* [Pridham et al., Applied Microbiology 6, 52–79 (January 1958)]. The spores are oval to elliptical.

The organism does not sporulate well on many media such as glucose-peptone, glucose-asparagine, nutrient agar, etc. On tomato paste-oatmeal and Pridham's yeast-malt extract agars, the spore color is light yellow on which basis it could be assigned to the yellow series or to the olive-huff series.

The aerial mycelium is light yellow with a deep yellow orange vegetative mycelium. The soluble pigment is light yellow to brownish.

The physiological characteristics are as follows: Nonchromogenic. Proteolysis: gelatin and casein decomposed. Tyrosinase: positive. Starch: hydrolyzed. Calcium malate: hydrolyzed. $H_2S$: negative. $NO_3$: reduced to $NO_2$.

Carbon assimilation on basal medium of Pridham and Gottlieb [Jour. Bact. 56, 107–114 (1948)].

A comparison of the above characteristics with the description of Lindenbein, Arch. Mikrobiol. 17, 361–383 (1952), as well as a comparison with a culture of *Streptomyces chrysomallus* ATCC 11523 indicates that the two cultures are identical and that the isolate described above is a strain of *Streptomyces chrysomallus*.

*Streptomyces chrysomallus* produces an antibiotic, hereinafter called perlimycin which has antibacterial activity. Perlimycin is produced by culturing *Streptomyces chrysomallus* at a temperature in the range of about 23° C. to 30° C., preferably about 25° C. under submerged aerobic conditions in an aqueous nutrient medium containing an assimilable, fermentable carbohydrate source and an assimilable nitrogen source. Suitable carbohydrate sources include starch, dextrin, sugar, such as maltose, lactose, and glucose, glycerol etc. Suitable nitrogen sources include asparagine, casein hydrolysate, soybean meal, beef extract, yeast extract etc. Fermentation is carried out for about 24 to 175 hours preferably about 160 hours. At the end of this period of time, a substantial amount of perlimycin has been formed.

Perlimycin may be obtained by working up the total fermentation broth, but preferably by working up the mycelial cake obtained by adding a small amount of filter aid (3%) to the total broth (without pH adjustment) and after a period of agitation, e.g., about one hour, filtering off the mycelium and filter aid. The mycelial cake may be preserved in a moist state in deep freeze for future workup or it may be dried before storage. Since perlimycin is a neutral product no adjustment of the pH of the cake material is necessary before processing.

If the mycelial cake has been dried, the mycelium can be extracted directly by a water immiscible solvent such as chloroform, benzene or hexane. If the moist cake is to be processed, an extraction first with a water miscible solvent such as n-propanol, acetone or the like (used as an approximately 66% solvent, 34% water mixture) is desirable. In the latter case, after several passes of the solvent mixture (normally at elevated temperature, e.g., about 85° C.), the pooled solvent extracts are evaporated in vacuo to a small volume of essentially aqueous residue containing suspended solids. This aqueous residue is then thoroughly extracted with a water immiscible solvent such as chloroform, benzene or hexane which removes the perlimycin. Perlimycin is only slightly soluble in hexane. The latter solvent, however, slowly extracts the perlimycin from the aqueous suspension.

The water immiscible solvent extract, either from the aqueous extract or from the dried mycelial cake, is then evaporated in vacuo under reduced temperature (30 to 40° C.) to yield an oily residue which usually partially crystallizes. It is necessary to wash the residue with small portions of hexane or ether to separate the bulk of oily contaminants from the perlimycin. The insoluble, washed residue is semicrystalline and may be recrystallized by dissolving in a minimum quantity of warm methanol or acetone and allowing it to cool. By recrystallizing several times, the product is obtained as a colorless crystalline material with constant melting point. A crystalline perchlorate (oxonium salt) is obtained by adding a 60 percent perchloric acid solution to a solution of perlimycin in glacial acetic acid. The crystalline salt separate out and after washing with cold, glacial acetic acid may be dried over potassium hydroxide in the vacuum desiccator. This perlimycin perchlorate can be recrystallized from glacial acetic acid. When treated with methanol, ethanol or water, however, it dissociates and regenerates the neutral perlimycin.

EXAMPLE 1

The microorganism *Streptomyces chrysomallus* is isolated from a soil sample by conventional streaking methods and maintained on an agar slant made from 65 g. of rolled oats and 1000 ml. of distilled water which are cooked to a thin gruel in a double boiler, filtered through several layers of cloth and restored to original volume. 2% agar is added and sterilized at 15 pounds steam pressure for 30 minutes.

A well sporulated slant is used to inoculate 125 ml. of a broth having the following composition:

| | |
|---|---|
| Soybean meal | 15 grams. |
| Dehydrated mashed potatoes | 15 grams. |
| Glucose | 50 grams. |
| $CoCl_2.2H_2O$ | 10 ml. of 0.05% solution. |
| $CaCO_3$ | 10 grams. |
| Agar | 2.5 grams. |
| Distilled water | 1000 ml. |
| Autoclaved at 15 pounds steam pressure for 30 minutes. | |

A 500 ml. flask containing 125 ml. of the above medium inoculated from the agar slant is incubated at 25° C. for 3 days on a rotary shaker (280 r.p.m.).

A 10% inoculum is then made from the above and introduced into 500 ml. Erlenmeyer flasks each containing 135 ml. of the following medium:

| | |
|---|---|
| Soybean meal | 15 grams. |
| Dehydrated mashed potatoes | 15 grams. |
| Glucose | 50 grams. |
| $CoCl_2.2H_2O$ | 10 ml. of 0.05% solution. |
| $CaCO_3$ | 10 grams. |
| Distilled water | 1000 ml. |
| Autoclaved at 15 pounds steam pressure for 30 minutes. | |

The flasks are incubated and shaken on a rotary shaker (280 r.p.m.) for 7 days. At the end of this period the broth is pooled and agitated overnight with two volumes of n-propanol. The mixture is filtered through coarse filter paper. The propanol and most of the water is distilled off by means of a rotating film evaporator until the volume is reduced to about 1/20. This aqueous suspension is then repeatedly extracted with hexane (4 or 5 times with 1/2 volumes). The combined hexane extracts, after backwashing with a small volume of water, are evaporated to dryness in vacuo. The only residue partially crystallizes on standing (or can be scratched or seeded). The crystalline solid is separated from the oil by washing with small volumes of cold methanol, acetone or ether. The crystalline material is recrystallized by dissolving in the minimum volume of hot methanol or acetone and allowing to cool. Yields of approximately 35 to 40 mg. per 150 ml. of broth are obtained.

Instead of working up the whole fermentation broth as described, the mycelial cake may be obtained by stirring the whole broth with 4 percent by weight/volume of a filter-aid (e.g., Hyflo Super-Cel) and filtering off the mycelium. The washed, moist cake is then vacuum dried. One part of dried, mycelial cake is slurried in 28 parts by volume of chloroform (100 g. of cake in 2800 ml.), agitated for 1 hour and filtered. The cake is washed with a small portion of chloroform, and then the combined chloroform extracts evaporated to dryness in vacuo. The addition of a small amount of hexane usually induces crystallization and the crystalline product is washed, separated and recrystallized as previously described. The yield from 100 g. of dried cake is approximately 0.5 to 0.6 gms.

EXAMPLE 2

Crystalline perlimycin is dissolved in dioxane and lyophilized. The resulting amorphous perlimycin is suspended in sesame oil in a proportion of 1 gm. per 100 ml. The suspension remains homogeneous and may be injected intramuscularly or intraperitoneally at a dosage level of 125 to 200 mg.

EXAMPLE 3

Finely powdered crystalline perlimycin is suspended in sesame oil in a proportion of 2 gm. per 100 ml. The suspension remains homogeneous and may be administered as in Example 2.

EXAMPLE 4

An aqueous medium consisting of 6.6 mg./ml. of sodium chloride, 0.4 mg./ml. of Tween 80, 7.5 mg./ml. of sodium carboxymethylcellulose and 9 mg./ml. of benzyl alcohol is prepared. Lyophilized perlimycin, screened through 325 mesh and sterilized (with carboxide) is homogenized in the aqueous medium in a proportion 125 mg./ml.

Perlimycin is a colorless crystalline substance melting at 147–152° C. It is very soluble in chloroform, benzene, pyridine; moderately soluble in methanol, ethanol, propanol, n-butanol, n-pentanol, acetic acid, acetone, dioxane, ethyl ether, isopropyl ether, and methyl Cellosolve, N,N-dimethylformamide; less soluble in hexane; very slightly soluble in water (no effect of pH on solubility in water). Specific rotation $[\alpha]_D^{25}$ 0°±2°, $c=1.0$ (chloroform). No specific absorption in the ultra violet above 210 mµ.

The dry crystalline material is very stable. The activity is very stable when the substance is kept in alcoholic solution at 0° or 24° C. for long periods of time. The compound is not readily attacked at 24° C. by methanolic potassium hydroxide solution, but at elevated temperature (66° C.=reflux temperature), the material is attacked. It is stable to warming in acetic acid solution, a solvent from which it can be crystallized.

The elemental composition determined by analysis of constant melting material brought to constant weight is C, 65.30; H, 8.50; O (by difference), 26.25. No nitrogen, sulfur, halogen or other atoms are present.

The molecular weight of perlimycin is about 736. The neutralization equivalent of a crystalline complex of the substance with perchloric acid (oxonium salt) is 839 and the percent of chlorine in the complex is 4.5. Structural evidence indicates that the antibiotic is a polyester composed of units of a hydroxy acid, $C_{10}H_{18}O_4$. The equivalent weight of 184 obtained by saponification with refluxing ethanolic potassium hydroxide indicates that there are four ester linkages present. These data show that the molecular formula of perlimycin is $C_{40}H_{64}O_{12}$.

Group analysis has yielded the following results: 0.0 for acid groups titratable with sodium methoxide; 0.0 for $OCH_3$ by Zeisel determination; approximately 15.0% C-methyl groups by Kuhn-Roth procedure; 0.0 acetyl groups; no consumption of acetic anhydride in pyridine solution at 24° C.; no consumption of periodic acid; no evidence for carbonyl group by Brady's reagent; no uptake of hydrogen with platinum in acetic acid solution; negative Molisch, ferric chloride and Liebermann-Burchard reactions.

The infrared absorption spectrum of perlimycin in Nujol mull is reproduced in FIGURE I which accompanies this specification. Perlimycin shows infrared bands at the following frequencies and wave lengths (s= strong, m=medium, w=weak, sh=shoulder):

Table I

| Wavelength, µ | Frequency, cm.$^{-1}$ | | Wavelength, µ | Frequency, cm.$^{-1}$ | |
|---|---|---|---|---|---|
| 3.4 | 2,970 | m | 9.14 | 1,094 | m |
| 5.8 | 1,738 | s | 9.43 | 1,063 | s |
| 6.8 | 1,470 | m | 9.8 | 1,022 | s |
| 7.0 | 1,425 | w | 10.0 | 1,000 | sh |
| 7.23 | 1,382 | w | 10.25 | 975 | w |
| 7.32 | 1,368 | w | 10.55 | 948 | w |
| 7.37 | 1,355 | w | 10.73 | 932 | m |
| 7.5 | 1,335 | s | 10.95 | 912 | w |
| 7.75 | 1,292 | w | 11.20 | 893 | w |
| 7.94 | 1,260 | s | 11.50 | 868 | w |
| 8.4 | 1,190 | s | 11.75 | 852 | w |
| 8.57 | 1,166 | w | 12.30 | 812 | m |
| 8.67 | 1,154 | s | 12.65 | 792 | sh |
| 8.82 | 1,136 | m | 13.30 | 753 | w |
| 8.95 | 1,117 | s | | | |

One gram of perlimycin is dissolved in 15 ml. of glacial acetic acid at 24° C. and to the resulting solution is added dropwise a solution prepared by mixing 1000 ml. of 60% perchloric acid with 3 volumes of glacial acetic acid within a few moments, or by scratching, a crystalline precipitate forms. The perchloric acid solution is added until no further precipitation occurs. The crystalline product is filtered off on a sintered glass funnel, washed with small portions of cold glacial acetic acid and dried in a vacuum desiccator over KOH pellets. The yield is 1.05 grams. The melting point determination shows darkening to copper color at 135–140° with liquefaction at 173° and vigorous decomposition at 178° C.

Perlimycin is useful as an antibacterial agent, especially as a laboratory reagent in culture media, either alone or in combination with other antibacterial agents, to inhibit the growth of bacteria such as Staphlococcus aureus, Micrococcus sp. and Bacillus sp. and prevent heavy overgrowth of such organisms when attempting to demonstrate the presence of such organisms as Klebsiella pneumoniae in cultures from swabs used in diagnostic procedures. Chloroform, methanol or ethanol solutions may be used.

Perlimycin also shows cytotoxic activity by inhibiting Earle's L cells (mouse fibroblasts, NCTC 929) and Ehrlich ascites cells [Jackson et al. Can. J. Biochem. Physiol. 38; 1377–1378 (1960)], when grown in monolayers and suspension culture.

What is claimed is:
1. An antibiotic selected from the group consisting of perlimycin and salts thereof, said perlimycin being a colorless material having the following average elemental analysis: C=65.30; H=8.50; O=26.25; specific rotation $[\alpha]_D^{25}=0\pm2°$; having a molecular formula of $C_{40}H_{64}O_{12}$ and a molecular weight of about 736; M.P. 147–152°;

very soluble in chloroform, benzene and pyridine; very slightly soluble in water; no specific absorption in the ultra violet above 210 mμ; and an infrared absorption spectrum in hydrocarbon oil as shown in the drawing.

2. A process for producing the antibiotic of claim 1 which comprises culturing *Streptomyces chrysomallus* under aerobic conditions in an aqueous nutrient medium comprising an assimilable, fermentable carbohydrate and assimilable organic nitrogen source for about three to seven days and recovering perlimycin from the medium.

3. A composition comprising perlimycin as defined in claim 1 and a pharmaceutically acceptable carrier in dosage unit form.

References Cited in the file of this patent

Pfizer: Handbook of Microbial Metabolites, 1961, p. 593.